Jan. 1, 1935.   I. L. POMEROY   1,986,160
STARTING DEVICE FOR ENGINES
Filed Dec. 23, 1931   2 Sheets-Sheet 1
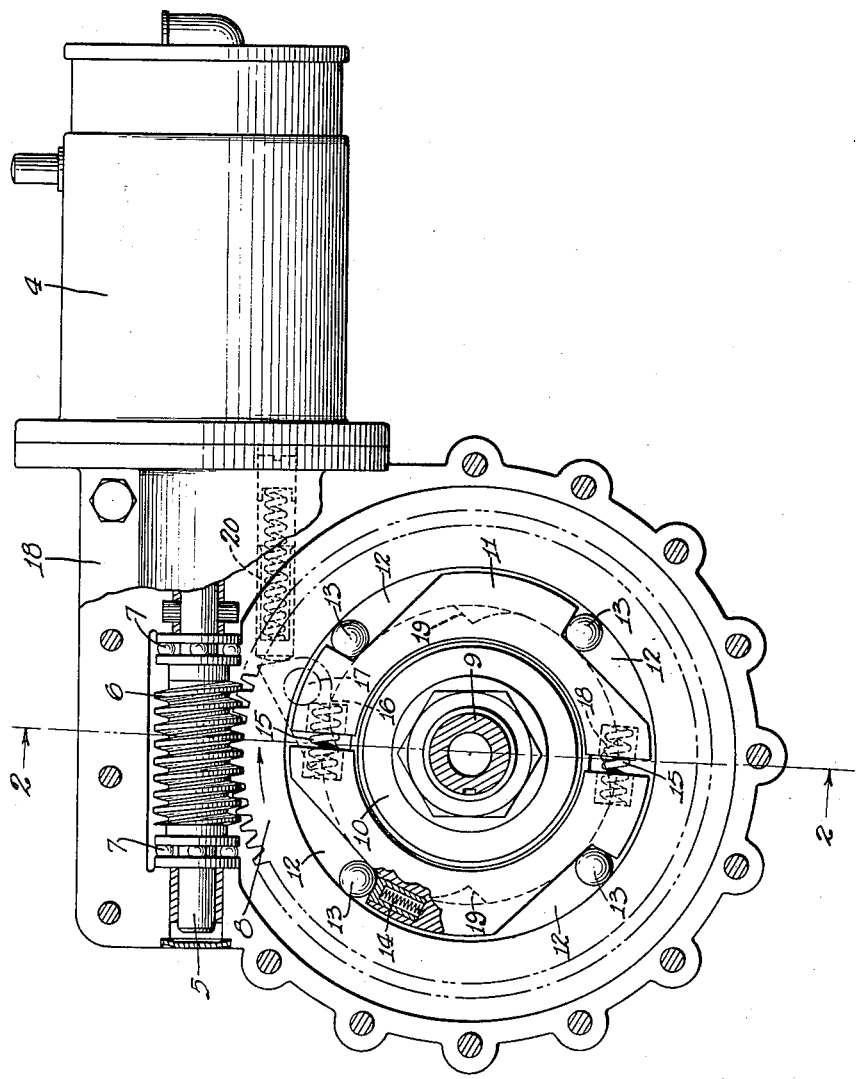
INVENTOR
Irving L. Pomeroy
BY
ATTORNEY Jan. 1, 1935.  I. L. POMEROY  1,986,160
STARTING DEVICE FOR ENGINES
Filed Dec. 23, 1931  2 Sheets-Sheet 2
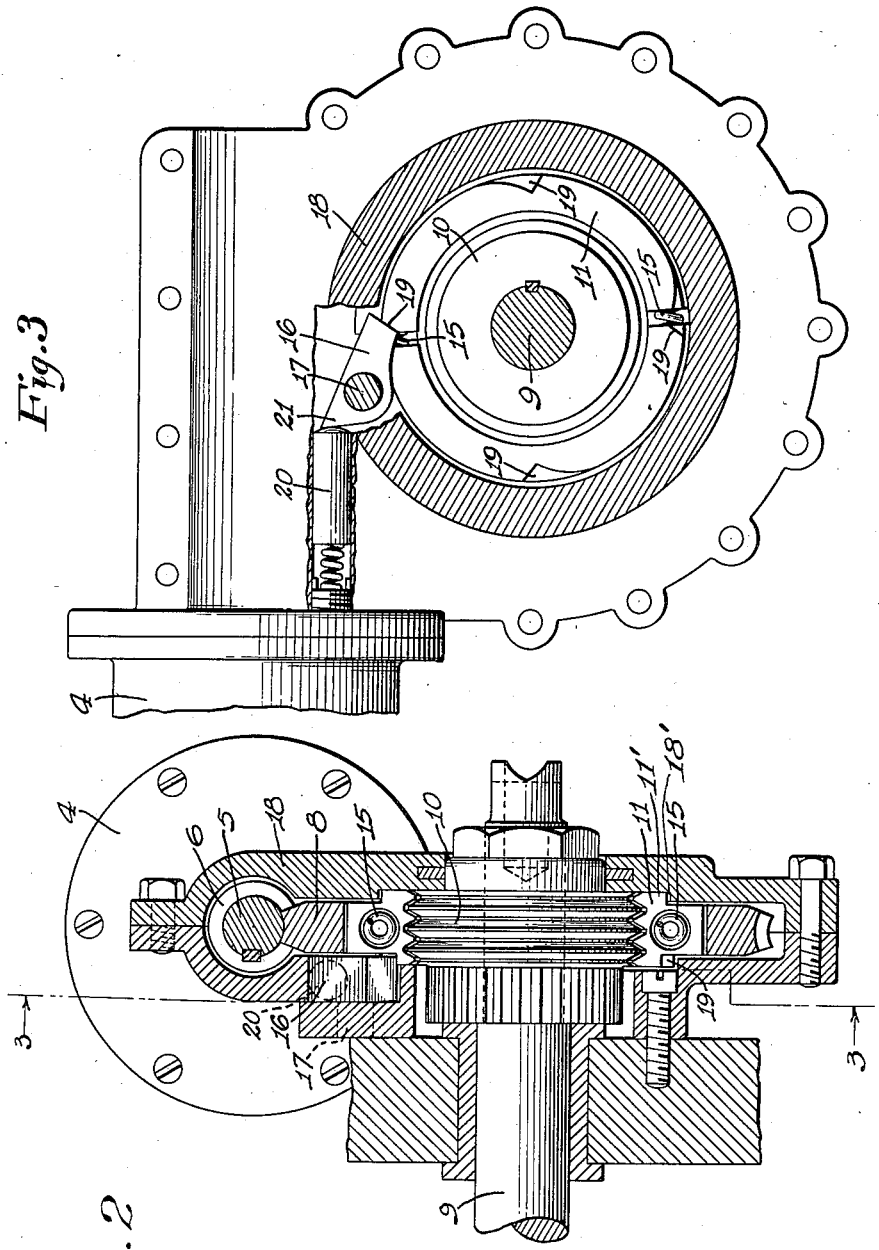
INVENTOR
Irving L. Pomeroy
BY
Wm. O. Bell
ATTORNEY Patented Jan. 1, 1935

1,986,160

UNITED STATES PATENT OFFICE 1,986,160

STARTING DEVICE FOR ENGINES

Irving L. Pomeroy, Maywood, Ill.

Application December 23, 1931, Serial No. 582,688

9 Claims. (Cl. 192—42)

This invention relates to starting devices for internal combustion engines and its principal object is to provide a novel and simple device which will operate quickly and efficiently and substantially silently.

Another object of the invention is to avoid the use in a starting device of gears which must be thrown into mesh to operate the device, thereby causing considerable noise and frequently breaking gear teeth, springs, and other parts, and to provide a novel starting device which operates without such gears and which makes it unnecessary to provide a gear on the engine flywheel.

Another object of the invention is to avoid the use of release springs of the kind which have heretofore been commonly used in starting devices to unmesh the gears quickly when the engine starts, and which frequently break, and to provide a starting device which will take hold and release quickly without shock or jar and without liability of damaging any of the parts.

And a further object of the invention is to provide a starting device which does not require to be located in proximity to the engine flywheel but which may be arranged at any convenient location on the crank shaft.

In the accompanying drawings illustrating a selected embodiment of the invention Fig. 1 is a side elevation of the starting device partly in section and with the housing partly broken away.

Fig. 2 is a sectional view on the line 2—2 of Fig. 1, and

Fig. 3 is a sectional view on the line 3—3 of Fig. 2.

Referring to the drawings, an electric motor 4 has an armature shaft 5 carrying a worm 6 keyed thereon between thrust bearings 7 and meshing with the worm gear or drive ring 8. A crank shaft 9 has a drive collar 10 keyed thereon and this collar is arranged within a gripper ring 11 which is interposed between the drive ring and the drive collar. The opposing surfaces of the drive collar and the gripper ring may be smooth-faced but I preferably provide them with complementary endless threads or corrugations, Fig. 2, to enlarge the contact surfaces thereof. The gripper ring is provided with tangential notches 12 in its periphery to accommodate rollers 13 which operate between the inclined faces of the notches and the inner periphery of the drive ring. Spring plungers 14 mounted in the gripper ring at the inner ends of the notches engage the rollers 13 and push them forward into wedging engagement between the gripper ring and the drive ring, but this wedging action is not sufficient to thrust the gripper ring into operative contact with the drive collar unless the drive ring is operated as hereinafter described. The drive ring is carried by the rollers 13 and normally floats thereon. The gripper ring is preferably made in a plurality of sections with springs 15 interposed therebetween to separate the sections sufficiently to clear the gripper ring from operative contact with the drive collar.

The separation of the sections of the gripper ring effected by the springs 15 is limited by the engagement of the hub 11' provided on the sections of the gripper ring with a shoulder 18' formed by recessing a side wall of the housing 18.

The starter thus described will operate as follows:—The motor 4 operates the worm 6 which drives the drive ring 8 clockwise, and the drive ring urges the rollers 13 forward in the notches 12, and by wedging action between the drive ring and the gripper ring the gripper ring is caused to contract into frictional engagement with the drive collar to operate the drive collar and rotate the crank shaft. Immediately the engine takes hold the crank shaft begins to rotate at a higher rate of speed and, since the gripper ring is frictionally clamped to the drive collar and the drive collar is keyed on the crank shaft, the gripper ring will also increase its speed of revolution, and thereupon the rollers 13 will move rearward in the notches to the large end thereof, and the springs 15 will expand the gripper ring and release it from engagement with the drive collar.

Ordinarily the rollers 13 will be caused to move as soon as the drive ring starts to revolve but there may be times when the drive ring will make one or more revolutions before the rollers move relatively to the drive ring and sufficiently to contract the gripper ring into operative engagement with the drive collar. This will merely delay the operation of the starting device but to avoid this delay and to insure that the starting device will become completely operative almost instantaneously with the operation of the starting motor, I provide a dog 16 which is pivotally mounted at 17 in the housing 18 to engage a shoulder 19, one or more of which may be provided, on the gripper ring 11. The dog is under the constant pressure of a spring plunger 20 to engage a shoulder 19 but when the device is at rest the dog may engage the gripper ring away from a shoulder. The function of the dog is to hold the gripper ring momentarily at rest after the drive ring starts to revolve so that by the movement of the drive ring relatively to the gripper ring the rollers 13 will be immediately moved forward in their notches and by their wedging action clamp the gripper ring upon the drive collar. As many shoulders 19 may be provided as desired, I prefer four as shown, so that any lost motion will be because the dog is resting upon the gripper ring between shoulders and, therefore, such lost motion will be limited to the distance between shoulders. As soon as the gripper ring begins to revolve the dog will be caused to slide out of engagement with the inclined shoulder.

The invention is simple in construction, it comprises few parts, it eliminates the clashing which occurs when gears are thrown into mesh and the liability of breaking teeth, and it insures quick action in taking hold and in releasing. The springs 15 have very little movement and their work is not of such a character which makes them liable to break. If these springs did not act quickly to release the gripper ring the latter would simply travel with the drive collar and sufficiently free from the drive ring not to speed up the drive ring so that there would be no danger of damage to any of the parts. Even if all the springs 15 should break there would be very little lost motion before the rollers move sufficiently to provide the wedging action required to clamp the gripper ring upon the drive collar. The device is compact in structure and can be easily arranged in the engine assembly at any convenient location on the crank shaft without regard to the flywheel.

I have shown the invention in a selected embodiment which I consider satisfactory for ordinary automobile engines but to adapt it for different engines and for other reasons it may be necessary to change the form, construction and arrangement of parts and I reserve the right to make all such changes as fairly fall within the scope of the following claims.

I claim:

1. In a starting device for engines, the combination with driving means and a driven member, a drive member operated by said driving means, a gripper ring disposed around the driven member, means interposed between the gripper ring and the drive member to move the gripper ring into operative engagement with the driven member to transmit movement of the drive member through the gripper ring to the driven member, said gripper ring consisting of a plurality of movable sections having their ends juxtaposed, and springs extending between said ends and normally expanding said sections from engagement with said driven member and separating said ends from each other.

2. In a starting device for engines, the combination with driving means and a driven member, of a drive member operated by said driving means, a gripper ring between the driven member and the drive member and disposed around said driven member and adapted to be contracted into clamping engagement therewith, clamping means for effecting frictional engagement between the drive member and the gripper ring and for contracting the gripper ring into frictional engagement with the driven member for communicating the drive of the drive member to the driven member, and means effecting relative movement between the drive member and the gripper ring to effect said engagement of said clamping means.

3. In a starting device for engines, the combination with driving means and a driven member, of a drive member operated by said driving means, a gripper ring between the drive member and the driven member, clamping devices between the drive member and the gripper ring for frictionally clamping the gripper ring on the driven member, means cooperating with the drive member and the gripper ring to effect relative movement between the drive member and the gripper ring to engage said clamping devices, and means for disengaging said clamping devices upon rotation of said driven member at a greater speed than said drive member.

4. In a starting device for engines, the combination with driving means and a driven member, of a drive member operated by said driving means, a gripper ring between the drive member and the driven member, wedge acting means between the drive member and the gripper ring for effecting operative engagement of the gripper ring with the driven member, and means for momentarily holding the gripper ring against movement to effect quick action of said wedge acting means.

5. In a starting device for engines, the combination with driving means and a driven member, of a drive member operated by said driving means, a gripper member interposed between the drive member and the driven member and capable of being clamped upon the driven member, wedge acting rollers interposed between the drive member and the gripper member, and a dog having operative engagement with the gripper member to effect relative movement between the drive member and the gripper member until the rollers operate to clamp the gripper member upon the driven member for communicating the drive of the drive member to the driven member.

6. In a starting device for engines, the combination with driving means and a driven member, of a drive member operated by said driving means, a contractible and expansible gripper ring around the driven member and normally free therefrom, operative means operated by the drive member for effecting operative engagement of the gripper ring with the driven member to communicate the drive of the drive member to the driven member, a housing enclosing the driving means, driven member, drive member, gripper ring and operative means, and means in the housing for limiting expansion of the gripper ring.

7. In a starting device for engines, the combination with driving means and a driven member, of a drive member operated by said driving means, contractible and expansible friction means between the drive member and the driven member and adapted for frictional engagement with said driven member and means between the friction means and the drive member to render the friction means automatically operable for communicating the drive of the drive member to the driven member, and means for limiting the expansion of said friction means.

8. In a starting device for engines, the combination with driving means and a driven member, of a drive member operated by said driving means, a sectional gripper ring around the driven member and normally free therefrom, means operated by the drive member for contracting the gripper ring into engagement with the driven member to communicate the drive of the drive member to the driven member, and means interposed between the sections of the gripper ring for expanding the sections to free the gripper ring from the driven member.

9. In a starting device for engines, the combination with driving means and a driven member, of a drive member operated by said driving means, a contractible and expansible gripper ring around the driven member and normally free therefrom, operative means operated by the drive member for effecting operative engagement of the gripper ring with the driven member to communicate the drive of the drive member to the driven member, a housing enclosing the driving means, driven member, drive member, gripper ring and operative means, said gripper ring including a hub, and means in the housing and engageable by said hub for limiting expansion of the gripper ring.

IRVING L. POMEROY.